United States Patent [19]

Zerbst et al.

[11] Patent Number: 5,423,650
[45] Date of Patent: Jun. 13, 1995

[54] RETRACTABLE CARGO RACK ASSEMBLY

[76] Inventors: James E. Zerbst, P.O. Box 165, Shell, Wyo. 82441; Raymond L. Douglas, P.O. Box 303, Osage, Wyo. 82723

[21] Appl. No.: 188,923

[22] Filed: Jan. 31, 1994

[51] Int. Cl.⁶ .............................................. B60R 9/045
[52] U.S. Cl. .................................... 414/462; 224/310
[58] Field of Search ................. 298/12, 14; 414/462, 414/522, 477; 224/310

[56] References Cited

U.S. PATENT DOCUMENTS

| | | |
|---|---|---|
| 1,389,642 | 9/1921 | George . |
| 1,508,946 | 9/1924 | Alderman . |
| 1,600,614 | 9/1926 | Anthony ................... 298/12 |
| 1,693,543 | 11/1928 | Biszantz . |
| 1,755,803 | 4/1930 | Anthony ................... 298/12 |
| 2,318,971 | 5/1943 | Roumage et al. . |
| 2,765,940 | 10/1956 | Nelson . |
| 2,828,035 | 3/1958 | Kuchinskie . |
| 3,282,455 | 11/1966 | Demarais ................. 414/462 |
| 3,494,729 | 2/1970 | Kruse ...................... 224/310 |
| 3,531,006 | 9/1970 | Farchmin . |
| 4,015,879 | 4/1977 | Shonkwiler . |
| 4,329,100 | 5/1982 | Golze ...................... 224/310 |
| 4,484,851 | 11/1984 | Gottlieb et al. .......... 414/921 |
| 4,932,829 | 6/1990 | Miller ...................... 298/14 |

FOREIGN PATENT DOCUMENTS

| | | |
|---|---|---|
| 891894 | 2/1972 | Canada . |
| 67723 | 12/1982 | European Pat. Off. ......... 224/310 |
| 3335173 | 4/1985 | Germany ........................ 224/310 |
| 76342 | 5/1983 | Japan ............................. 224/310 |
| 2118501 | 11/1983 | United Kingdom ............ 224/310 |

Primary Examiner—Michael S. Huppert
Assistant Examiner—Thomas J. Brahan
Attorney, Agent, or Firm—Bacon & Thomas

[57] ABSTRACT

A cargo rack is provided which is intended to supported on a support structure, such as the roof of a vehicle, and to be retractable to facilitate loading and unloading of the rack. The retractable cargo rack assembly includes a base frame adapted to be securely mounted to the support structure and a cargo rack that is supported by the base frame but which is movable between a retracted position, in which the cargo rack is positioned juxtaposed to the base frame, and an extended position for loading/unloading. To facilitate shifting of the cargo rack, a power drive mechanism is provided to automatically position the cargo rack in either of its retracted or extended positions upon actuation of the power drive mechanism. Once in the extended position, one or more platforms attached to the cargo rack can be shifted relative to the cargo rack. Once shifted, the platforms are substantially located in respective horizontal planes. While in this position, luggage or other cargo can be readily loaded upon or unloaded from the platforms, Once the loading/unloading operation is complete, the power drive mechanism can be activated to automatically retract the cargo rack.

19 Claims, 7 Drawing Sheets

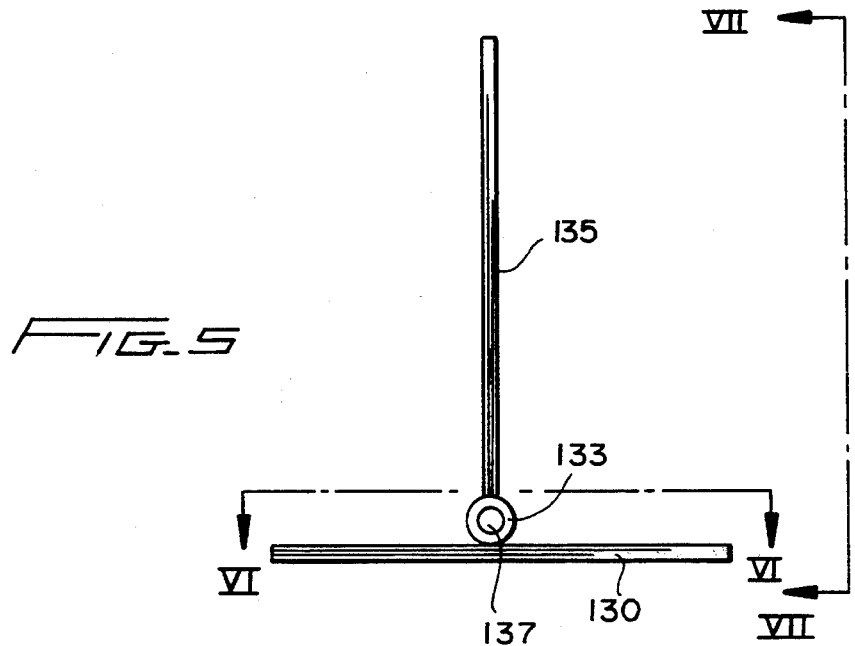
FIG. 5
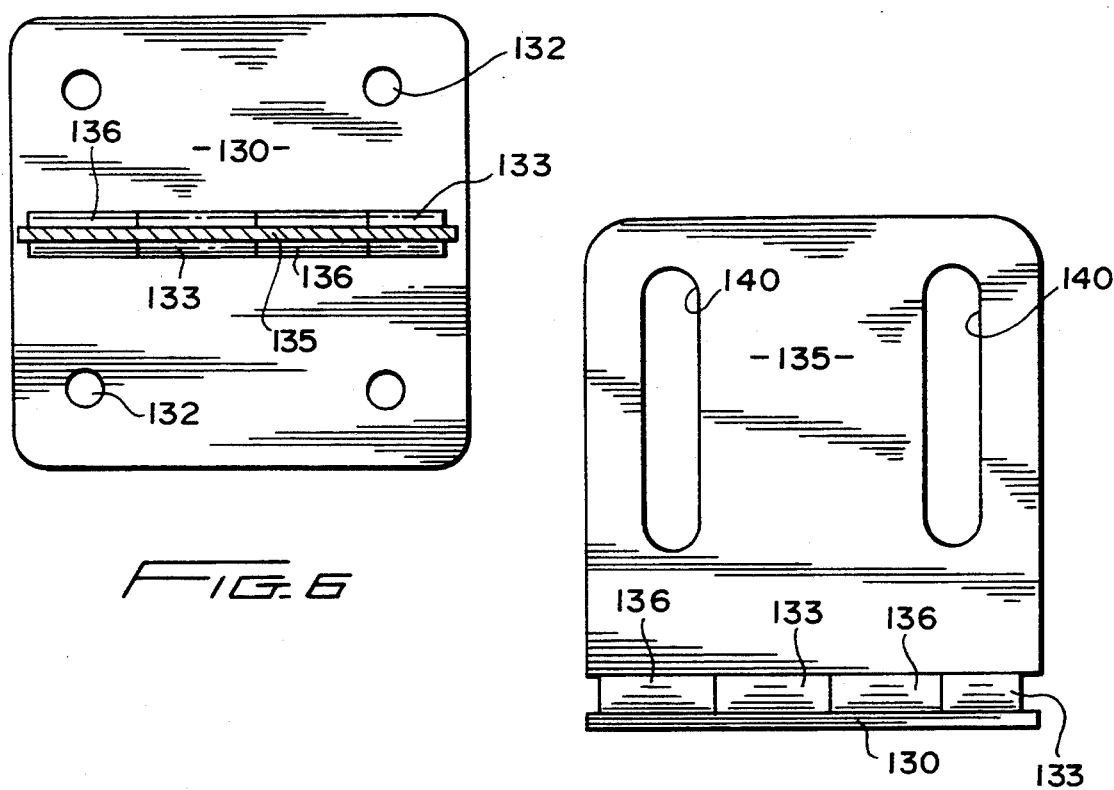
FIG. 6
FIG. 7

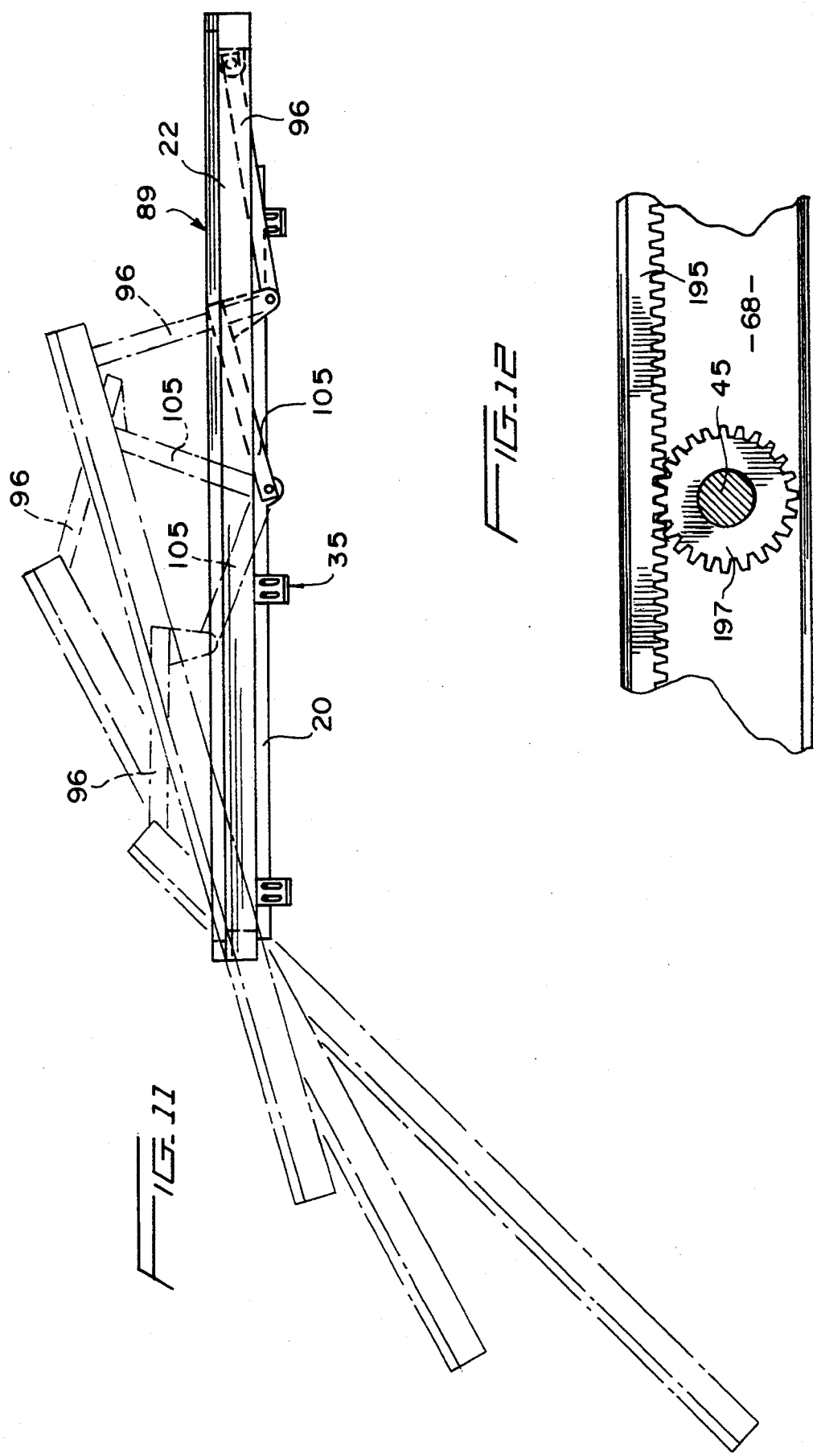

RETRACTABLE CARGO RACK ASSEMBLY

BACKGROUND OF THE INVENTION

1. Field of the Invention

The present invention pertains to a cargo rack assembly which is intended to be supported upon a vehicle or the like and, more particularly, a cargo rack assembly which is retractable to facilitate loading and unloading thereof.

2. Discussion of the Prior Art

It is commonly known to provide a cargo rack on the roof of a vehicle such that luggage or other cargo can be secured on the rack instead of requiring the cargo to be placed within passenger space of the vehicle. Such racks commonly found on the marketplace today generally comprise only a pair of spaced rails secured to the roof of the vehicle. Cargo can be placed between the rails and secured thereto by a rope or other fastening members. These types of cargo racks present a loading problem, particularly when the items to be placed thereon are extremely heavy or bulky, since the items have to be completely lifted to a position between the rails. This problem is amplified with larger vehicles, such as suburbans, vans, RV's, etc., wherein the roofs of the vehicles are at a height which makes loading and unloading of the cargo particularly difficult.

Additional cargo carriers or racks that can be repositioned from a position atop a vehicle to a lower, loading/unloading position and which can be retracted again to a position atop the vehicle for transport purposes have also been proposed in the prior art as evidenced by U.S. Pat. Nos. 2,765,940, 2,828,035 and 3,531,006. Unfortunately, such retractable cargo rack assemblies have not been successful in today's marketplace. This fact is mainly attributable to the particular construction of such cargo racks, their associated costs of manufacture and loading/unloading characteristics associated therewith. For instance, cargo racks constructed in the manner set forth in accordance with the '035 Patent identified above, assume a substantially vertical loading/unloading position. Not only does the particular orientation of the rack in the loading/unloading position mandate the manner in which cargo items must be loaded or unloaded, generally the distribution of weight of the cargo will be uneven in order to prevent the weight of heavy objects from bearing upon lighter items. In addition, the cargo rack must be manually moved to its associated transport position atop the vehicle which effectively constrains the amount of weight that can be placed thereon.

Some of the disadvantages associated with the cargo rack assembly disclosed in the '035 Patent are overcome in the luggage carrier arrangement disclosed in the above-identified '006 Patent. For example, in the '006 Patent, a crank mechanism is provided to aid in retracting the cargo rack. In addition, in the loading/unloading position, the cargo rack assumes a substantially horizontal position which greatly facilitates loading and unloading thereof. Unfortunately, the construction of the luggage carrier in this patent requires an extensive framework that extends not only atop the vehicle but also down the entire rear side thereof. Therefore, not only is this luggage carrier arrangement aesthetically unappealing, it limits access to the rear of the vehicle. This, of course, would be extremely disadvantageous in some circumstances, such as if the rear of the vehicle includes a door or access window.

Therefore, there exists a need in the art for a retractable cargo rack assembly which is aesthetically appealing, economical to manufacture and which is constructed to facilitate loading and unloading thereof.

SUMMARY OF THE INVENTION

It is the object of the present invention to provide a cargo rack assembly that is adapted to be secured to a support structure, such as the roof of a vehicle, wherein the cargo rack can be readily placed in a loading/unloading position and retracted to a storage or transport position.

It is another object of the present invention to provide a retractable cargo rack assembly which is constructed so as to be economical to manufacture and aesthetically appealing.

It is a further object of the present invention to provide a retractable luggage rack assembly which facilitates loading and unloading thereof.

These and other objects of the invention are achieved by providing a cargo rack which is intended to be supported on a support structure, such as the roof of a vehicle, and which is automatically retractable to facilitate loading and unloading of the rack. More particularly, the retractable cargo rack assembly of the invention includes a base frame that is adapted to be securely mounted to a support structure and a cargo rack that is supported by the base frame but which is movable between a retracted position in which the cargo rack is positioned juxtaposed to the base frame and an extended, loading/unloading position. To facilitate shifting of the cargo rack, a power drive mechanism is provided to automatically position the cargo rack in either of its retracted or loading/unloading positions upon actuation thereof. Once in the loading/unloading position, one or more platforms attached to the cargo rack can be shifted relative to the cargo rack towards a horizontal plane. Luggage or other cargo can then be removed from or placed upon and secured to the platform while the platform remains in its substantially horizontal position. In the preferred embodiment, two such platforms are provided. Once the loading/unloading operation is complete, the power drive mechanism can be activated to automatically retract the cargo rack.

With this construction, loading and unloading of the cargo rack assembly of the invention is facilitated by the presence of the platforms and their ability to assume a substantially horizontal position. In addition, due to the particular manner in which the cargo rack is attached to the base frame, a minimum number of structural elements is required in order to achieve a compact and aesthetically appealing cargo rack assembly.

Additional objects, features and advantages of the present invention will become more readily apparent from the following detailed description of preferred embodiments thereof when taken in conjunction with the drawings wherein like reference numerals refer to corresponding parts in the several views.

BRIEF DESCRIPTION OF THE DRAWINGS

FIG. 5 is a side view of a hinge member used to mount the cargo rack assembly upon a support structure.

FIG. 6 is a cross-sectional view generally taken along line VI—VI of FIG. 5.

FIG. 7 is a cross-sectional view generally taken along line VII—VII in FIG. 5.

FIG. 11 is a schematic side view depicting various positional stages of the retractable cargo rack assembly of the invention during use.

FIG. 12 is a side view of a second embodiment of the drive transfer arrangement incorporated in the retractable cargo rack assembly of the invention.

DETAILED DESCRIPTION OF THE PREFERRED EMBODIMENTS

Figure 1:
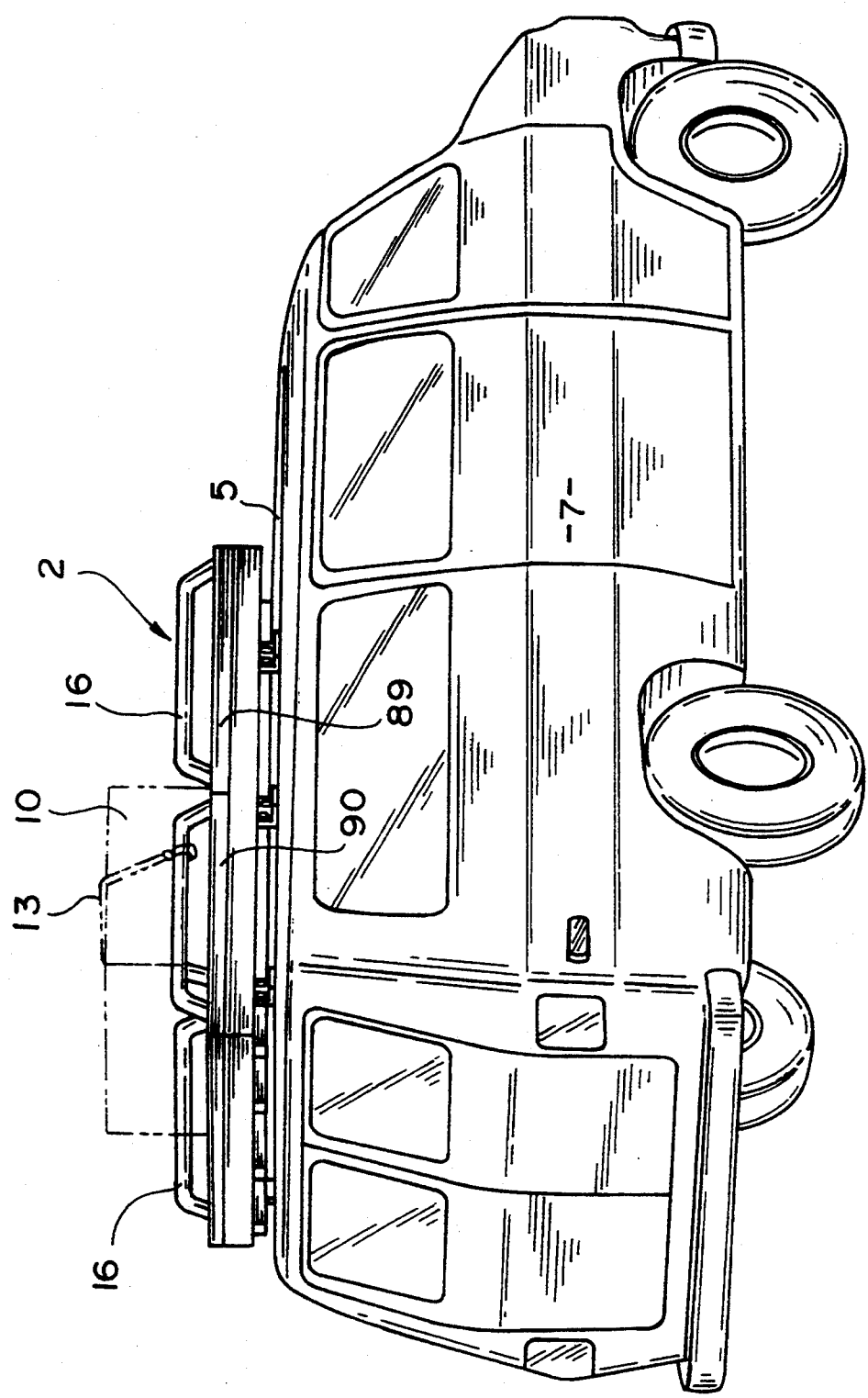
FIG. 1 is a perspective view of a vehicle having the retractable cargo rack assembly of the invention secured upon a roof thereof.

With initial reference to FIG. 1, the retractable cargo rack assembly of the present invention is generally indicated at 2. Although cargo rack assembly 2 is shown fixedly secured to a roof portion 5 of a vehicle 7, it should be readily understood that the cargo rack assembly 2 could be utilized in various environments and need not only be associated with a vehicle. For example, the cargo rack assembly 2 could be utilized in connection with storing items from a rafter of a building. Cargo rack assembly 2 is adapted to support pieces of cargo, such as generally indicated at 10, which is secured upon cargo rack assembly 2 by means of a strap or other tie-down member 13 which is connected to rails 16.

Figure 2:
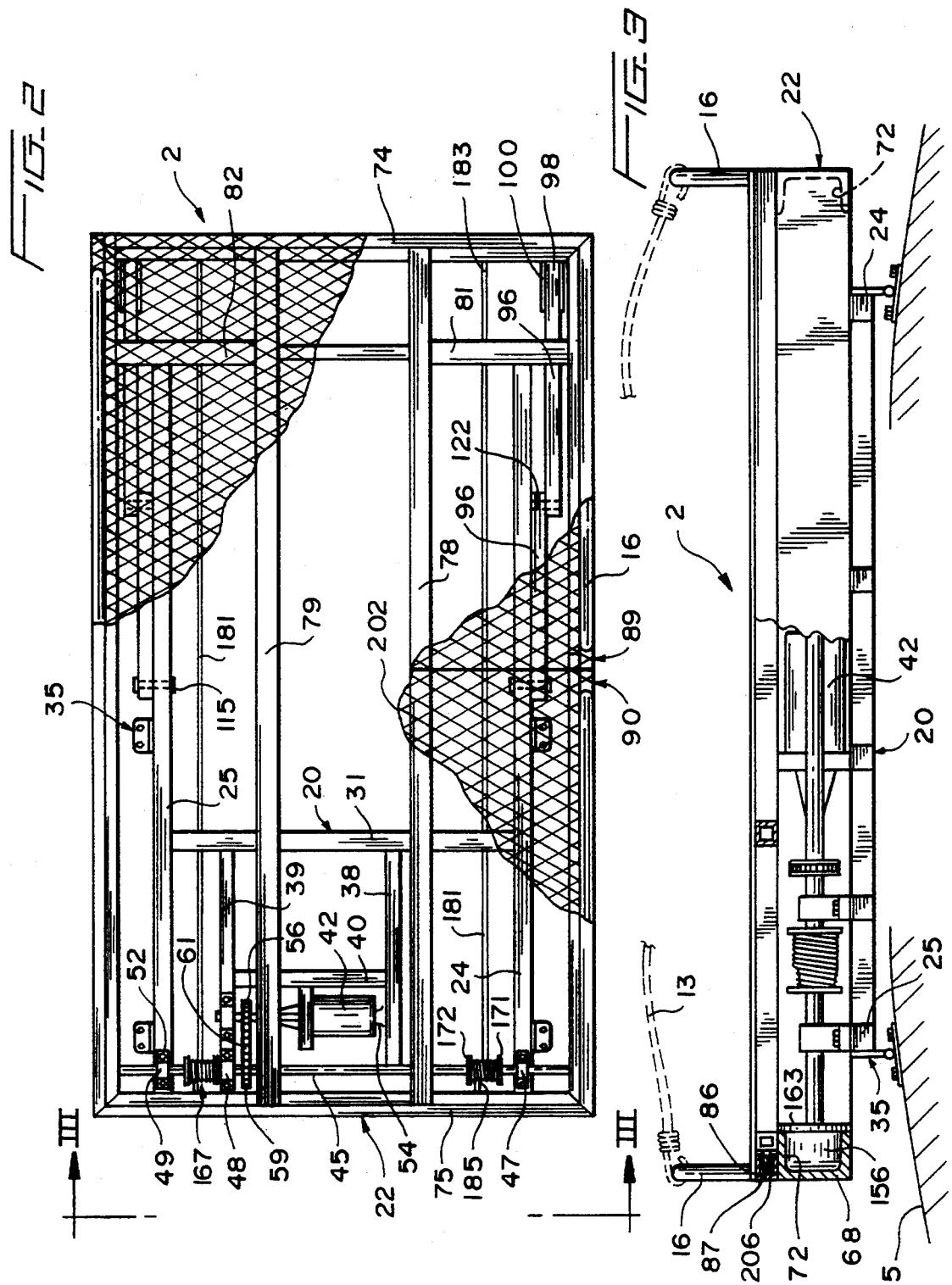
FIG. 2 is a top view of the retractable cargo rack assembly of the invention with portions of the cargo rack being broken away.
Figure 3:
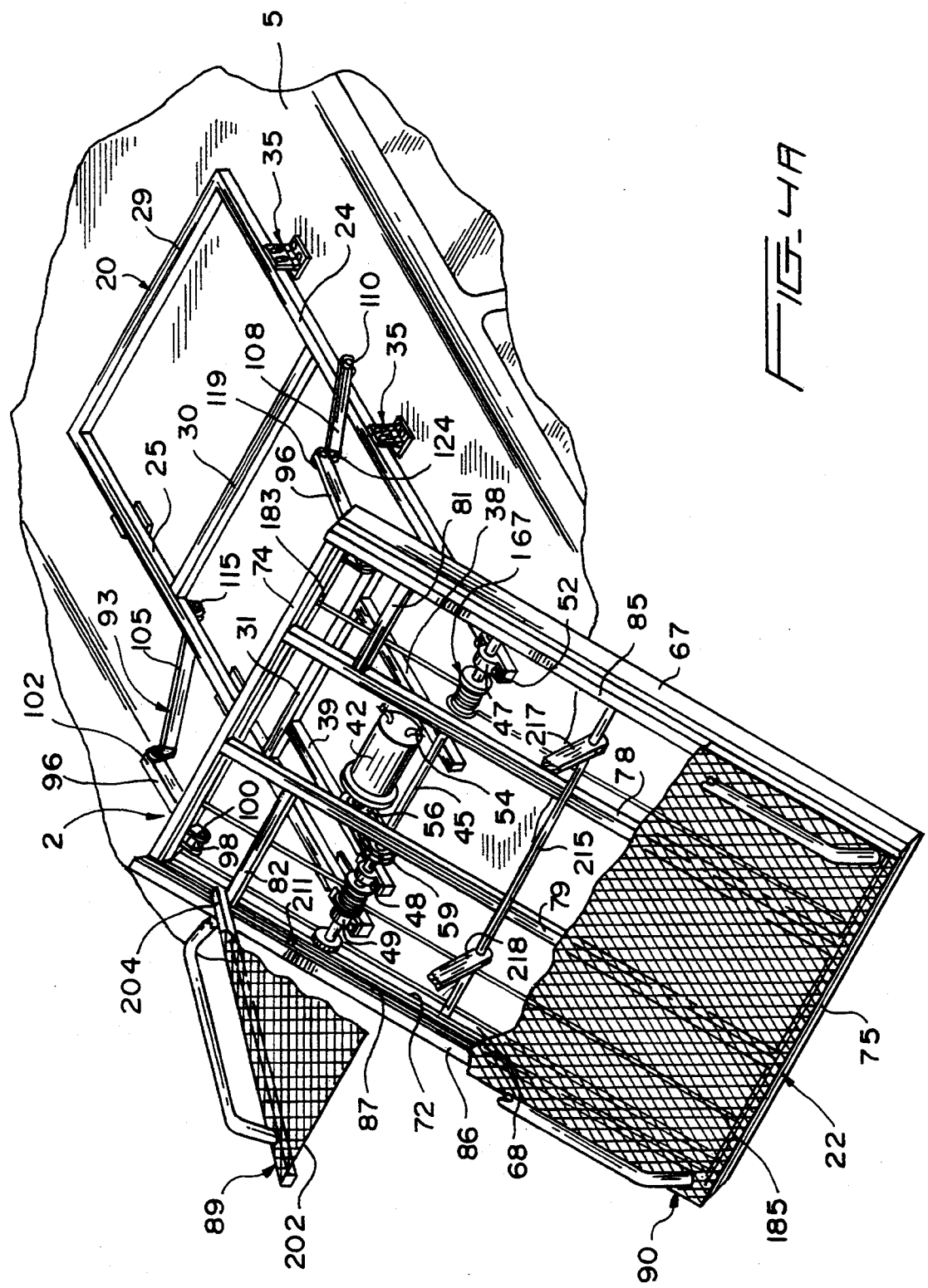
FIG. 3 is a cross-sectional view generally taken along the line III—III of FIG. 2.
Figure 4:
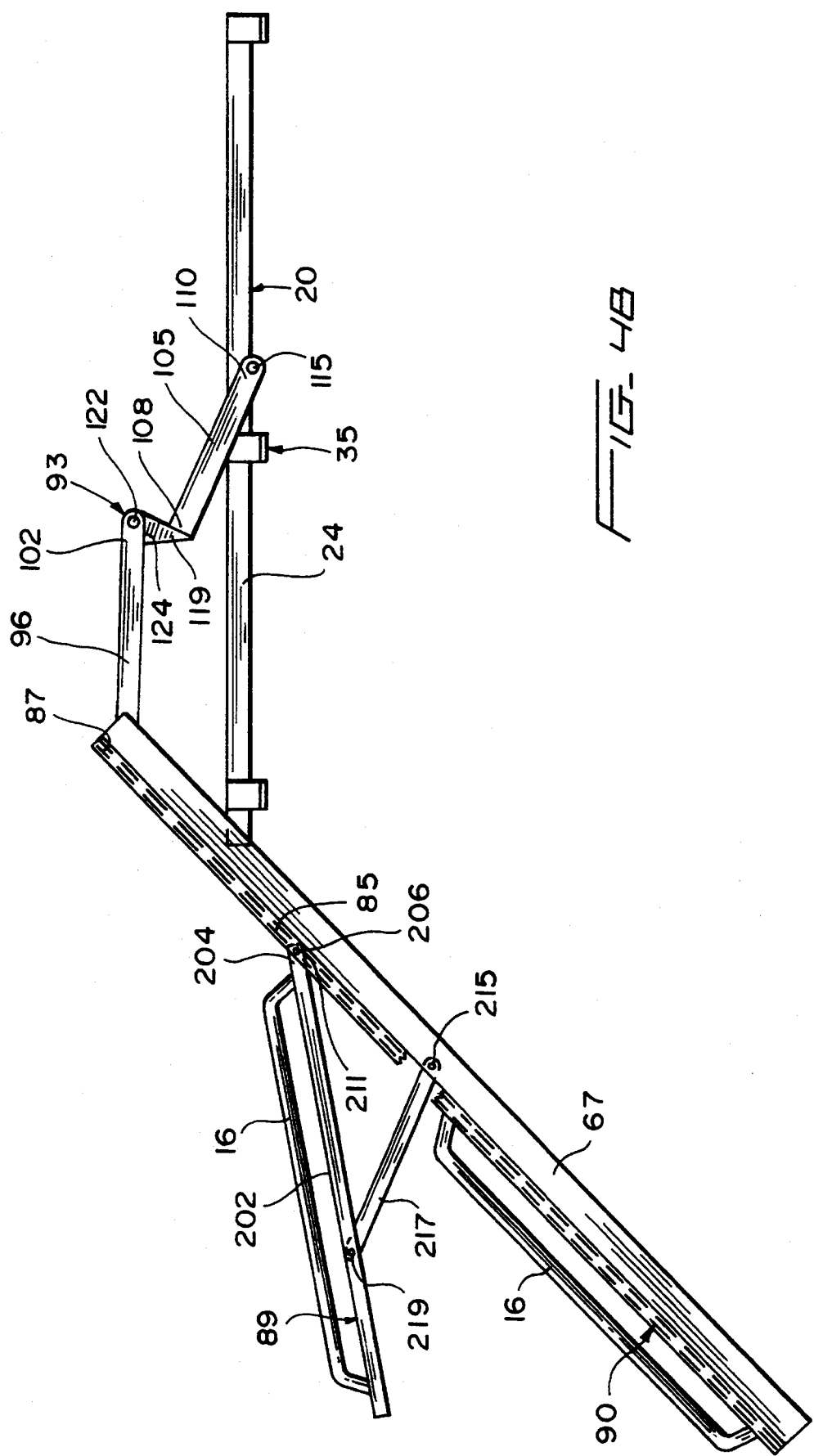
FIG. 4A is a perspective view of the retractable cargo rack assembly in a loading/unloading position.
FIG. 4B is a side view of the retractable cargo rack assembly in its loading/unloading position.

The particular structural elements that constitute cargo rack assembly 2 will now be described in more detail with specific reference to FIGS. 1-4. Cargo rack assembly 2 generally comprises a base 20 and a cargo rack 22. Base 20 is formed from a pair of longitudinally extending, transversely spaced and generally parallel frame members 24 and 25 that are interconnected by a plurality of longitudinally spaced cross braces 29-31. Base 20 is adapted to be securely mounted upon roof portion 5 or another support structure by means of a plurality of spaced hinge member 35. The particular construction of hinge members 35 and the manner in which they are utilized to secure base 20 upon a support structure will be detailed more fully below. Base 20 further includes two additional longitudinally extending support members 38 and 39 that are fixed to cross brace 31 and which are located laterally inwardly of frame members 24 and 25 as best shown in FIGS. 2 and 4A. Support members 38 and 39 are also interconnected by a supplemental cross brace 40 as best shown in FIG. 2.

Secured to supplemental cross brace 40 of base 20 is a bi-directional rotary drive motor 42. A shaft 45 extends transversely across base 20 and is rotatably mounted to base 20 by means of a plurality of journals 47-49. As will be discussed more fully below, the ends (not labeled) of shaft 45 extend laterally outwardly of frame members 24 and 25 respectively. In the preferred embodiment shown, journals 47-49 are secured by means of screws 52 to frame member 24, support member 39 and frame member 25 respectively. In the preferred embodiment, motor 42 is a bi-directional electric motor that can be selectively activated to rotate in either a clockwise or counterclockwise direction by means of a switch (not shown), perhaps provided on a detachable power cord, positioned in an electrical circuit between wires 54 of motor 42 and a power source (not shown). In the preferred embodiment wherein cargo rack assembly 2 is mounted upon the roof portion 5 of a vehicle 7, motor 42 preferably operates on power supplied from a 12 V DC power source such has the vehicle's battery.

Motor 42, along with shaft 45 and additional structure to be described below, is part of an overall power drive mechanism which enables cargo rack 22 to be pivoted and shifted relative to base 20 between retracted and extended positions. In a retracted position, cargo rack 22 is juxtaposed and substantially overlies base 20 as best represented in FIGS. 1 and 3. In its extended position, cargo rack 22 assumes the position best shown in FIGS. 4A and 4B. The particular manner in which cargo rack 22 is shifted between its retracted and extended positions will also be detailed further below.

Motor 42 is provided with a drive gear 56 that is fixedly secured to an output shaft (not labeled) thereof. Drive gear 56 is drivingly connected with a driven gear 59, that is fixedly secured to shaft 45, by means of a chain 61. Although in the preferred embodiment, this drive transfer arrangement includes a pair of gears and interconnecting chain, it should be readily understood that various other drive transfer arrangements could be utilized in accordance with the present invention such as replacing the drive and driven gears 56 and 59 with pulleys that are interconnected by a belt. From the foregoing description, it should be readily understood that rotation of drive gear 56 by actuation of motor 42 results in rotation of shaft 45 through driven gear 59 and chain 61. Rotation of shaft 45 results in pivoting and sliding of cargo rack 22 relative to base 20 as will be discussed more fully below in describing two preferred embodiments of the invention following a detailed description of cargo rack 22.

Cargo rack 22 is defined by a pair of longitudinally extending rail members 67 and 68 which are laterally spaced and arranged substantially parallel to one another. Each of the rail members 67, 68 is generally U-shaped in cross-section such that each rail member 67, 68 defines a respective guide channel 72, both of which face inwardly. Cargo rack 22 further includes a pair of end rails 74 and 75 that are fixedly secured to rail members 67 and 68 so as to form an integral structural unit. Additional longitudinally extending support rails 78 and 79 are also provided, as well as various reinforcing members 81 and 82. Mounted atop or integrally formed with rail members 67 and 68 are a pair of guide rails 85 and 86 respectively. Guide rails 85 and 86 are also substantially U-shaped in cross-section so as to define inwardly facing channels 87. Pivotally and slidably attached to cargo rack 22 is also a pair of platforms 89 and 90 as will be detailed hereinafter.

Cargo rack 22 is interconnected with base 20 of cargo rack assembly 2 by means of a pair of linkage assemblies 93. Each linkage assembly 93 includes a first linkage member 96 having a first end portion 98 that is pivotally secured within a bifurcated bracket 100 that is fixedly attached to cargo rack 22 and a second end portion 102. Each linkage assembly 93 further includes a second linkage member 105 that has a first end portion 108 pivotally attached to second end portion 102 of first linkage member 96 and a second end portion 110 that is pivotally secured to a respective one of rail members 67 and 68 by means of a pin 115. First end portion 108 of second linkage member 105 is preferably formed with an integral stop member 119 which is pivotally secured to second end portion 102 of first linkage member 96 by means of a pin 112 but which further includes a widened portion 124 that can abut first linkage member 96 to limit the permissible relative pivoting between first linkage member 96 and second linkage member 105 (see FIG. 4B) as well as the relative movement between cargo rack 22 and base 20 of cargo rack assembly 2. This stop feature will be more fully discussed below in describing the range of movement between cargo rack 22 and base 20 as cargo rack 22 is shifted between its fully extended and retracted positions.

Reference will now be made to FIGS. 5–7 in describing the particular construction of hinge members 35 and the manner in which base 20 is fixedly secured upon a support structure. Each hinge member 35 includes a hinge base 130 provided with a plurality of spaced apertures 132 and multiple upstanding hinge elements 133. Upstanding hinge elements 133, as widely known in the art of hinges, include aligned apertures (not labeled). Each hinge member 35 further includes a hinge plate 135 that also includes multiple hinge elements 136 that are adapted to be interengaged with hinge elements 133 such that a through hole extends entirely through hinge elements 133 and 136. This through hole is adapted to receive a pin 137 which defines a pivot axis of the hinge member 35. Hinge plate 135 is preferably formed with a pair of spaced slots 140 and 141.

In application, each hinge plate 135 is adapted to be loosely secured to a respective frame member 24, 25 by means of screws or the like. Thereafter, base 20 of cargo rack assembly 2 is placed upon the roof portion 5 of a vehicle 7 or other support structure such that additional fasteners (not particularly shown) can extend through spaced apertures 132 provided in hinge base 130 to secure each hinge base 130 to the support structure. Thereafter, the screws or other fastening members extending through slots 140 and 141 can be tightened to fixedly secure base 20 upon the support structure. It should be readily recognized that base 20 can be secured to a support structure in numerous ways, with or without the use of additional brackets or hinge members depending upon the configuration of the support structure. When cargo rack assembly 2 is mounted on a roof portion 5 of a vehicle 7, hinge members 35 are particularly advantageous since the hinge connection between hinge plate 135 and hinge base 130, along with the use of slots 140 and 141, provide for an adjustable attachment arrangement which can accommodate the particular curvature associated with roof portion 5.

As best shown in FIG. 4A, opposing hinge members 35 are preferably mounted laterally outwardly of frame members 24 and 25. Although the hinge members 35 could be mounted laterally inwardly of frame members 24 and 25, the preferred positioning provides easy access to the fastening members. In addition, due to the presence of the hinge connection, it is important to place hinge members 35 at locations wherein pivoting of one hinge member in a particular direction will be counteracted by another hinge member. This positioning of hinge members 35, in conjunction with the use of multiple hinge members, has been found to provide a firm attachment arrangement for base 20 while enabling cargo rack assembly 2 to be mounted upon a variety of support structure surfaces, each of which has its own associated curvature.

Figure 8:
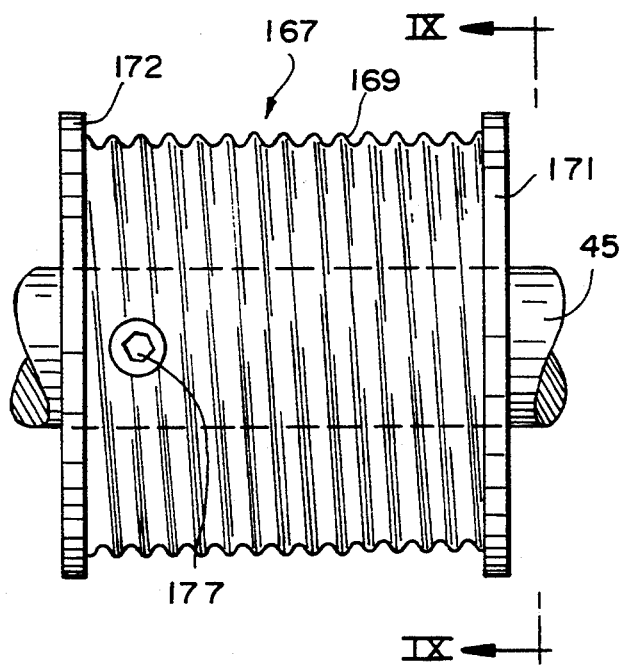
FIG. 8 is a front view of a winch member forming part of a drive transfer arrangement incorporated in retractable cargo rack assembly of the invention.
Figure 9:
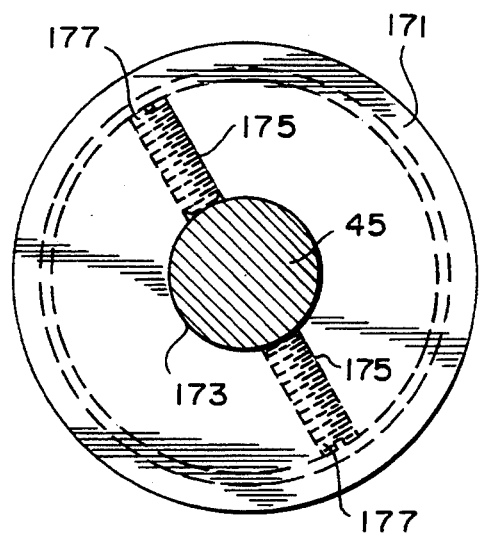
FIG. 9 is a cross-sectional view generally taken along line IX—IX in FIG. 8.
Figure 10:
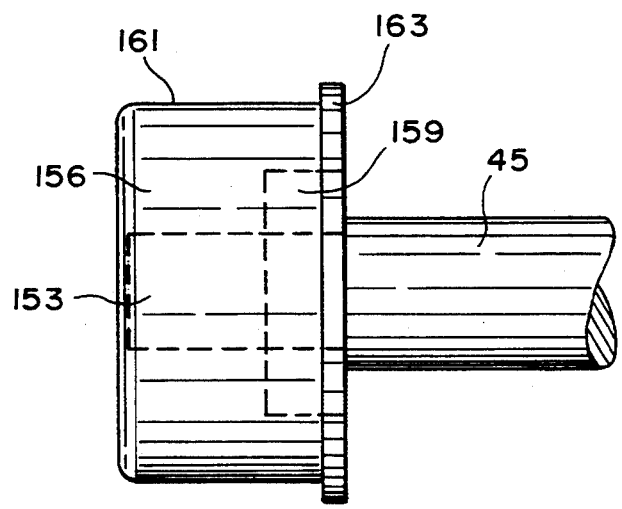
FIG. 10 is a perspective view of a trunnion member incorporated at a connection point between a cargo rack and a base frame of the assembly.

Particular reference will now be made to FIGS. 2–4 and 8–10 in describing a first drive transfer connection embodiment which enables motor 42 to reposition cargo rack 22 relative to base 20 between its extended and retracted positions. As best shown in FIG. 10, shaft 45 includes a reduced diameter end portion 153 that is received within a trunnion member 156. Trunnion member 156 is preferably made of nylon and is actually rotatably mounted upon reduced diameter end portion 153 of shaft 45 by means of a sealed bearing unit 159. The outer circumferential surface 161 of trunnion member 156 is adapted to be received within a respective guide channel 72 of rail members 67 and 68. Each trunnion member 156 is further provided with an enlarged diametric flange 163 which limits the extent to which trunnion member 156 can extend within its respective channel 72 as best shown in FIG. 3.

Shaft 45 also has fixedly secured thereto, at laterally spaced locations, a pair of winch units 167. Each winch unit, as best shown in FIG. 8, defines a helically grooved section 169 that is located between two spaced end flanges 171 and 172. As best represented in FIG. 9, each winch unit 167 is preferably formed with a central through hole 173 for receiving shaft 45 and a radially extending threaded bore 175. After winch unit 167 receives shaft 45 through central through hole 173, screws 177 are threadably placed within threaded bores 175 and are tightened against shaft 45 such that winch unit 167 will rotate in unison with shaft 45. Although this particular manner in which winch unit 167 is secured to shaft 45 for rotation therewith has been found to function adequately, it should be recognized that numerous other connection arrangements could also be utilized including providing a connector positioned within an aligned hole extending through winch unit 167 and shaft 45 or the use of one or more clamps between winch unit 167 and shaft 45. Each winch unit 167 has wound on helically grooved section 169 a cable 181 (see FIGS. 2, 3 and 4A). The first end 183 of cable 181 is attached to end rail 74 of cargo rack 22 and the second end 185 of cable 181 is secured to end rail 75 of cargo rack 22.

By this arrangement, when motor 42 is driven in a predetermined direction, shaft 45 will be rotated due to the interconnection between drive gear 56 and driven gear 59 by chain 61. Rotation of shaft 45, in turn, will cause winch units 167 to rotate such that cable 181 on each winch unit 167 will have one end portion being wound upon winch unit 167 and slack being simultaneously provided to its other end portion. Therefore, cable 181 will provide a pulling force on a predetermined end rail 74, 75 of cargo rack 22 depending upon the rotational direction of motor 42. In this manner, cargo rack 22 can be selectively positioned in its extended or retracted positions. In the preferred embodiment, motor 42 incorporates a limit switch (not shown) such that the motor will automatically shut off when the desired end position of cargo rack 22 is achieved. Of course, such a limit or end switch could also be associated directly with cargo rack 22 such that power is interrupted to motor 42 upon cargo rack 22 achieving a certain position in either direction. As evidenced in FIG. 11, actuation of motor 42 will cause cargo rack 22 to slide relative to base 20 at trunnion members 156 as well as to pivot about an axis defined by a line interconnecting trunnion members 156, i.e., an axis defined by shaft 45. As discussed above, when cargo rack 22 assumes its fully extended position, stop member 119 of second linkage member 105 also abuts first linkage member 96. Actually, according to the invention, linkage assemblies 93 aid in supporting, guiding and controlling the degree of travel of cargo rack 22 relative to base 20.

FIG. 12 shows an alternative embodiment for the manner in which cargo rack 22 can be driven between its extended and retracted positions. The embodiment of FIG. 12 substantially corresponds to the previous embodiment described above, however, trunnion members 156 and winch units 167, along with their corresponding integrated structure, are not utilized. Instead, each rail member 67, 68 is integrally formed or has attached thereto a rack gear 195 and the ends of shaft 45 have fixedly secured thereto a respective pinion gear 197. Each pinion gear 197 is interengaged with a respective rack gear 195 such that rotation of shaft 45 positively drives cargo rack 22 between its extended and retracted positions. While being shifted, cargo rack 22 will still be guided by means of linkage assemblies 93 and can pivot about pinion gears 197.

Once cargo rack 22 has assumed its fully extended position as shown in FIGS. 4A and 4B, cargo rack 22 will be inclined with respect to the vertical at a rather steep angle in a manner generally analogous to that discussed above with respect to the prior art. However, in accordance with the present invention, cargo rack 22 supports multiple platforms 89 and 90 as discussed above. In more detail, each platform 89, 90 includes a floor portion 202 that, in the preferred embodiment, constitutes a heavy wire grid. In these figures, platform 89 is shown to be pivoted and shifted relative to cargo rack 22. In FIG. 4B, platform 89 has assumed its associated loading/unloading position. To achieve this position, an end 204 of platform 89 is provided with a pair of opposing, laterally extending rollers or pins 206 which extend into channels 89 of respective guide rails 85 and 86. Within at least one channel 87, an abutment member 211 is provided which limits the permissible movement of pins 206 within channels 87. Platform 89 is also interconnected with cargo rack 22 through the use of a transverse bar 215 that extends between rail members 67 and 68 and a pair of guide links 217 and 218 that are pivotally mounted about transverse bar 215 and to platform 89 by means of pins 219 (one being shown in FIG. 4B).

With this construction, not only does abutment member 211 define the limit of travel of pins 206 within channels 89 as discussed above, but the length of guide links 217 and 218 define the position, relative to a horizontal plane, that platform 89 will assume when placed in its loading/unloading position. Although guide links 217 and 218 have been disclosed as being pivotally mounted upon transverse bar 215, it should be readily understood that guide links 217 and 218 could be fixedly secured to transverse bar 215 with transverse bar 215 being respectively journalled for rotation relative to cargo rack 22. In any event, the particular angle with respect to the horizontal that platform 89 will assume in its loading/unloading position can be easily varied by merely controlling the length of guide links 217 and 218. In the preferred embodiment, platform 89 assumes the loading/unloading position shown in FIG. 4B which has been found to best facilitate loading and unloading of platform 89. It should also be noted that the transverse bar and guide links associated with platform 90 have not been shown in the drawings for the purposes of clarity. In the preferred embodiment, both platforms 89 and 90 can be shifted and pivoted relative to cargo rack 22 wherein they will assume a substantially vertically spaced and parallel configuration. Once cargo rack 22 is placed in its extended position, either platform 89, 90 can be readily placed in its loading/unloading position by lifting up upon rail 16. In addition, each platform 89, 90 can be placed back to a position substantially overlying cargo rack 22 by pushing on rails 16 until guide links 217 and 218 have achieved an overcenter position whereupon gravity will cause the platform to drop down upon cargo rack 22.

Although described with respect to particular embodiments of the invention, it should be readily understood that various changes and/or modifications can be made to the invention without departing from the spirit thereof. For example, in an elaborate form of the invention, an additional power actuated mechanism could be utilized to shift platforms 89 and 90 relative to cargo rack 22 as well. In addition, the invention is not intended to be limited by the particular power drive arrangements disclosed as various drive systems could be utilized, including hydraulic and pneumatic actuators. Finally, in the preferred embodiment, cargo rack assembly 2 is generally made from aluminum components to reduce weight while preventing rusting, however, numerous materials could be used equally as well. A supplemental fiberglass skirt could also be provided about the cargo rack assembly for aesthetic purposes. In general, the invention is only intended to be limited by the scope of the following claims.

We claim:

1. A retractable cargo rack assembly comprising:
   a base frame;
   means for securely mounting said base frame to a support structure;
   a cargo rack supported by said base frame, said cargo rack being pivotally and slidably movable relative to said base frame so as to be shiftable between a retracted position in which said cargo rack is positioned juxtaposed to said base frame and an extended position;
   means for pivoting and shifting said cargo rack relative to said base frame between said retracted and extended positions;
   first and second platforms, supported by said cargo rack with said first platform being juxtaposed said second platform on said cargo rack, upon which cargo is adapted to be carried; and
   means for interconnecting each of said platforms to said cargo rack such that said platforms are individually movable relative to said cargo rack between loading/unloading and storage positions.

2. A retractable cargo rack assembly as claimed in claim 1, wherein said platforms are individually pivotally attached to said cargo rack by said interconnecting means.

3. A retractable cargo rack assembly as claimed in claim 2, wherein said interconnecting means further includes a slidable attachment connection between each said platform and said cargo rack.

4. A retractable cargo rack assembly as claimed in claim 3, further including means for individually limiting the pivoting and sliding movement of each said platform relative to said cargo rack.

5. A retractable cargo rack assembly as claimed in claim 1, wherein said cargo rack includes a pair of spaced, longitudinally extending and substantially parallel rail members defining guide channels, said pivoting and shifting means including a pair of transversely spaced trunnion members carried by said base frame, each of said trunnion members being received within a respective one of said guide channels.

6. A retractable cargo rack assembly as claimed in claim 5, wherein said pivoting and shifting means further includes at least one linkage assembly interconnected between said cargo rack and said base frame, said at least one linkage assembly including first and second linkage members, said first linkage member having a first end portion pivotally attached to said cargo rack and a second end portion, said second linkage member having a first end portion pivotally attached to the second end portion of said first linkage member and a second end portion pivotally attached to said base frame.

7. A retractable cargo rack assembly as claimed in claim 6, wherein said linkage assembly incorporates an integral stop member for limiting the degree of pivoting and shifting of said cargo rack relative to said base frame.

8. A retractable cargo rack assembly as claimed in claim 7, wherein said stop member is defined by the first end portion of said second linkage member, said stop member being adapted to engage the second end portion of said first linkage member upon reaching a predetermined permissible degree of relative pivoting between said first and second linkage members.

9. A retractable cargo rack assembly as claimed in claim 1, wherein said pivoting and shifting means includes drive means for drivingly pivoting and shifting said cargo rack relative to said base frame between both the extended and retracted positions of said cargo rack.

10. A retractable cargo rack assembly as claimed in claim 5, wherein said pivoting and shifting means further comprises:
a shaft rotatably mounted upon said base frame;
at least one drive transfer assembly secured to said shaft for rotation therewith, said drive transfer assembly being engaged with said cargo rack such that rotation of said shaft causes pivoting and shifting of said cargo rack relative to said base frame; and
a bi-directional drive unit drivingly connected to said shaft for rotating said shaft.

11. A retractable cargo rack assembly as claimed in claim 10, wherein said drive transfer assembly includes a winch member fixed to said shaft and a cable wrapped about said winch member, said cable having first and second ends thereof attached to opposing longitudinal ends of said cargo rack.

12. A retractable cargo rack assembly as claimed in claim 10, wherein said drive transfer assembly includes a pinion gear secured to said shaft, said pinion gear being drivingly engaged with a rack gear carried by one of said rail members.

13. A retractable cargo rack assembly as claimed in claim 1, wherein said means for securely mounting said base frame to a support structure comprises a plurality of hinge members for directly mounting said retractable cargo rack assembly to the roof of a vehicle.

14. A retractable cargo rack assembly as claimed in claim 13, wherein each of said hinge members includes a hinge base and a hinge plate pivotally secured to said hinge base, said hinge plate being secured to said base frame and said hinge base being adapted to be secured to a support structure.

15. A retractable cargo rack assembly as claimed in claim 14, wherein said hinge plate is pivotally secured to said hinge base along a longitudinal centerline of said hinge base.

16. A retractable cargo rack assembly as claimed in claim 14, wherein said hinge plate includes at least one slot for adjustably securing of said hinge plate to said base frame.

17. A method of operating a retractable cargo rack assembly that is mounted in a substantially horizontal plane upon a support structure comprising:
activating a drive unit to cause movement of a cargo rack, relative to a base frame that is mounted upon the support structure, from a retracted position juxtaposed said base frame to an extended position in which the cargo rack is shifted and pivoted relative to said base frame such that the cargo rack is angled downwardly with respect to the horizontal plane;
shifting at least one of first and second platforms, supported by the cargo rack with the first platform being juxtaposed and movable relative to the second platform, relative to the cargo rack from a respective storage position located atop the cargo rack to a respective loading/unloading position in which the platform is located in a plane closer to horizontal than the cargo rack at which the platform can be readily loaded/unloaded with cargo; and
re-activating said drive unit to cause the cargo rack to be automatically placed in its retracted position.

18. A method of operating a retractable cargo rack assembly as claimed in claim 17, wherein shifting of any one of said first and second platforms includes both pivoting and sliding of the platform relative to the cargo rack.

19. A method of operating a retractable cargo rack assembly as claimed in claim 18, further comprising moving the at least one of the first and second platforms to its associated storage position after loading/unloading thereof and prior to re-activating said drive unit.

* * * * *